Oct. 1, 1968 E. R. KUTCHER 3,403,932
PRESSURE RELIEF BOOT SEAL
Filed April 30, 1963 2 Sheets-Sheet 1
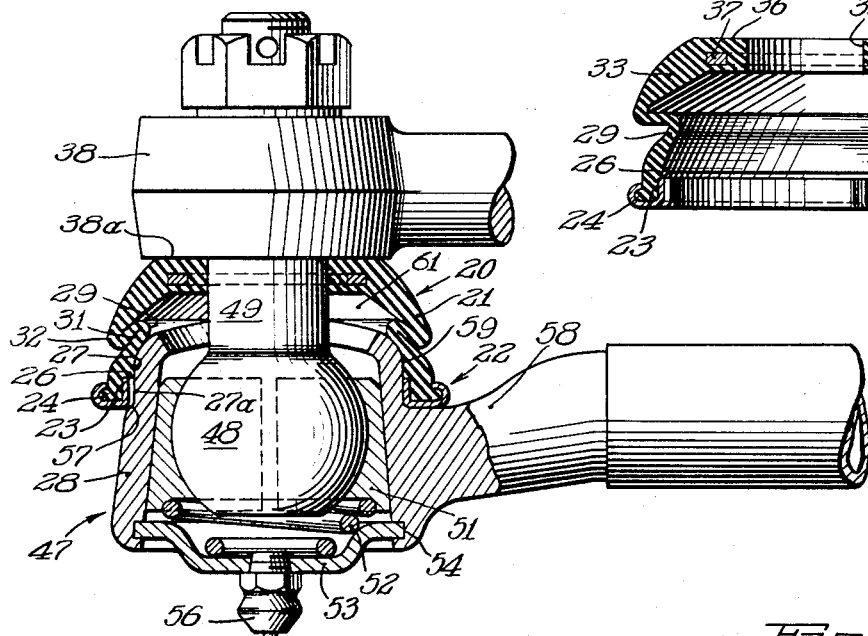
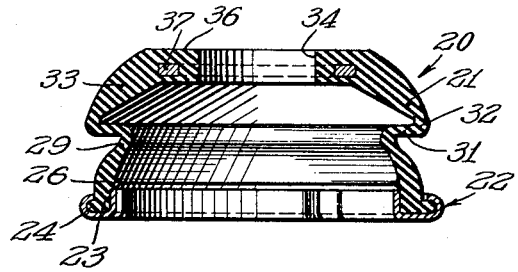
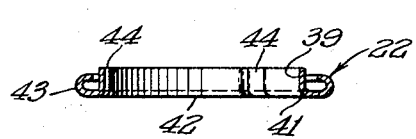
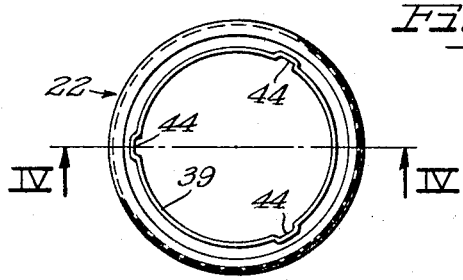
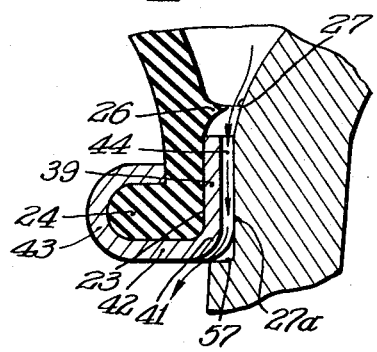
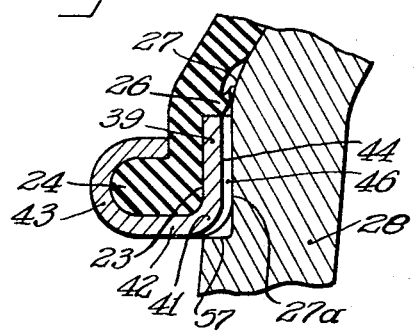
INVENTOR.
Eugene R. Kutcher
BY
Hill, Sherman, Meroni, Gross & Simpson
ATTORNEYS Oct. 1, 1968     E. R. KUTCHER     3,403,932
PRESSURE RELIEF BOOT SEAL
Filed April 30, 1963     2 Sheets-Sheet 2

INVENTOR.
Eugene R. Kutcher
BY
Hill, Sherman, Meroni, Gross & Simpson
ATTORNEYS

United States Patent Office 3,403,932
Patented Oct. 1, 1968

3,403,932
PRESSURE RELIEF BOOT SEAL
Eugene R. Kutcher, Warren, Mich., assignor to
TRW Inc., a corporation of Ohio
Filed Apr. 30, 1963, Ser. No. 276,774
6 Claims. (Cl. 287—87)

This invention relates to an inexpensive boot type seal, especially adapted for ball and socket type joints, although suitable for sealing articulating type joints of all types while still providing means for automatically relieving excessive internal pressures, as experienced during high pressure lubrication. Specifically this invention relates to a sealing boot for tie rod and wheel suspension ball joints of automotive vehicles which permits free movement of the joint studs and sockets and which protects against entry of external contaminants while at the same time providing for automatic release of excess amounts of lubricant.

This invention will be specifically described as embodied in a boot seal for a tie rod ball joint, but it should be understood that this invention can be used in other articulating type joints and as such has general utility for sealing the respective articulate members of a joint while simultaneously being capable of discharging excessive pressures from zones adjacent the members, therefore, the invention described herein is not to be limited to the preferred herein described embodiment.

In accordance with this invention the boot seal includes a flexible body of a generally frusto-ogive shape molded from an oil resistant rubbery material which permits it to be readily deformable when axial forces are exerted on the body but which also tends to reclaim its original molded shape. At one end of the body is a large open end which is encased with a collar or rigid ring that is sized to tightly embrace and seat upon the outer face of the socket. The opposite end of the body has a smaller diameter opening therethrough which is sized to sealingly engage the stud portion of the ball and an end wall which is adapted to sealingly engage with the radial surface of a member secured to the stud portion. Adjacent the large open end is an inner sealing lip which is adapted to sealingly engage the outer surface of the socket. Disposed in the rigid ring are vent means which provide an open passage between the low pressure side of the inner sealing lip and the outside of the boot seal. The vent means can take many forms including axial grooves on the inner surface of the ring, transverse slots which span the upper portion of the ring and also can take the form of a split ring wherein an entire segment of the ring is removed. The flexible body surrounds the shank of the ball stud in spaced relation providing a chamber between the upper face of the ball and the member secured to the stud portion of the ball.

Bellows-like convolutions are provided in the molded body and due to the resilience of the body material an axial thrust force is maintained thereby holding the end wall in sealing engagement with the radial surface of the member secured to the ball stud and also assuring that both the periphery of the inner lip sealingly engages with the outer face of the socket. The inner lip is quite flexible however and will readily deflect from the outer face of the socket when influenced by internal pressure thereby venting the chamber to the atmosphere through the passage in the ring and permitting the boot seal to relieve itself of excessive internal pressures. In the absence of excessive pressures however, the inner lip maintains good sealing engagement with the outer face of the socket thereby preventing the entry of external contaminants into the ball and socket type joint.

It is an object of this invention to provide an improved seal for articulating type joints.

It is a further object of this invention to provide a boot type seal which is automatically relieved from excessive internal pressures.

It is a still further object of this invention to provide a boot seal with an internal sealing lip which is adapted to be deflected to relieve excess grease or the like from the chamber enclosed by the boot.

A specific object of this invention is to provide a boot seal for ball and socket type joints with an inner lip deformed into sealing engagement with the socket and which cooperates with vent passages in a retaining ring to relieve the boot seal of excessive internal pressures.

Another and specific object of this invention is to provide an improved pressure relief system for boot type seals wherein vent passages are provided in a retainer ring for connecting the low pressure side of the sealing lip in the boot seal to the atmosphere.

Other and further objects of this invention will be apparent to those skilled in this art from the following detailed description of the annexed sheets of drawings illustrating preferred embodiments of the present invention wherein like reference numerals and characters refer to like and corresponding parts throughout the several views.

On the drawings:

FIGURE 1 is a vertical cross-sectional view, with parts in elevation, of a tie rod ball joint assembly equipped with the boot seal of this invention;

FIGURE 2 is a vertical cross-sectional view of the boot seal of this invention;

FIGURE 3 is a plan view of a ring for the boot seal of this invention;

FIGURE 4 is a sectional view taken along line IV—IV of FIGURE 3;

FIGURE 5 is a fragmentary vertical sectional view of the ring shown in FIGURE 3 and inner lip of the boot seal in sealing engagement with the socket;

FIGURE 6 is a fragmentary cross-sectional view, illustrating the manner in which excess pressures are relieved from the interior of the boot seal fitted with the ring shown in FIGURE 3;

As shown on the drawings:

Figure 7:
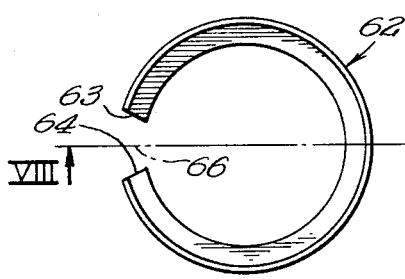
FIGURE 7 is a plan view of another embodiment of a ring for use with the boot seal of this invention.

In FIGURES 1 and 2 the reference numeral 20 designates generally a boot seal of this invention having a tubular body 21 composed of an oil resistant flexible and preferably resilient synthetic material, such as neoprene, and a rigid collar or ring 22, preferably composed of a corrosion resistant metal such as zinc or cadmium plated steel.

The body is molded into the generally frusto ogive free state shape shown in FIGURE 2 and has a large diameter open end with a cylindrical inner wall 23 and a surrounding lip or bead 24. A deformable lip or bead 26 projects inwardly from the cylindrical wall 23 and forms an inner sealing ring with an outer face 27 of a socket 28, as will be more fully explained later. The body converges inwardly from the internal lip 26 to a U-shaped portion 29 and then extends radially outward along a path 31 to a generally U-shaped bellows-like bulge 32. From the bulge 32 the body 21 converges radially inward along a wall 33 terminating in a small diameter opening defined by an inner cylindrical wall 34 and a flat end wall 36. An annular ring 37 is embedded in the body 21 adjacent the end wall or face 36 for reinforcement purposes in proving the ability of end wall 36 to sealingly engage the radial surface 38a of an eye end portion 38 of a steering linkage member or wheel arm.

The metal ring 22 has an internal cylindrical skirt 39 lining the cylindrical wall 23 and terminating at the bottom of the internal lip 26. From this cylindrical skirt 39 the ring extends outwardly from a rounded portion 41 to a radial flange 42 underlying the external bead 24. A U-shaped crimped portion 43 extends from the flange 42 around the bead 24 to clamp the ring 22 to the body 21. Axial grooves 44 extending the full height of the ring 22 provides passageways or vents 46 which serve to interconnect the low pressure side of the inner sealing lip 26 with the atmosphere.

In operation, as shown in FIGURE 1, boot 20 is somewhat collapsed from its free state height between the eye end member 38 and a ball joint tie rod end assembly 47 with the socket 28 and a ball means 48 rotatably and tiltably mounted therein. Projecting from ball means 48 is a ball stud shank 49 which is wedge locked into member 38. A plastic, preferably nylon split bearing ring 51 supports ball means 48 in socket 28 and permits free movement thereof. The bearing has a frusto-conical peripheral wall seated in a frusto-conical bore of the socket 28 and an upward thrust on the bearing 51 assuring proper wear, take up and positioning of ball means 48 in socket 28 is provided by coil spring 52 compressed in socket 28 between the large end of bearings 51 and a socket cover plate 53 which is fixedly engaged in circumferential groove 54 of socket 28. A lubricant fitting 56 is threadedly secured to plate 53.

The ring 22 of the boot seal 20 is sized so that it will snugly embrace outer face 27 of socket 28 as is shown at 27a and will bottom on shoulder 57 of the socket 28 and overlie the stem 58 of the tie rod end. At the opposite end of the tubular body 21 inner cylindrical wall 34 snugly receives ball stud shank 49 therethrough. The cylindrical inner surface of the lower portion of the body shown at 59 snugly fits socket 28 with inner resilient bead or lip 26 being deformed into sealing contact with outer face 27 of socket 28 when ring 22 is bottomed on shoulder 57.

Since the axial distance between member 38 and shoulder 57 is less than the free state height of the boot seal, the boot in its operating condition is partially axially collapsed in the same manner as a bellows. This collapsing is accommodated by flexing of the corner portion 29 and bulge portion 32 so that wall 31 which normally extends radially outward will be sloped downwardly as shown in FIGURE 1.

Axial force is exerted on end wall 36 causing it to sealingly engage radial surface 38a of member 38 by reason of the fact that body 21 is resilient and accordingly tends to reclaim its free state height.

Accordingly during lubrication of the ball joint tie rod assembly 47 a supply of lubricant under high pressures is injected into the interior of the socket 28 through the fitting 56 causing an excessive pressure to develop within the inner chamber 61. This excess pressure causes the resilient body 21 to expand to a point where lip seal 26 is displaced from the outer face 27 of socket 28. The excess lubricant is then allowed to flow out of the boot seal through passageway 46 defined by axial groove 44 in ring 22 as shown in FIGURE 6. The relief action continues until the internal pressure decreases to a point where the seal body 21 normalizes and allows inner lip 26 to return to its sealing engagement with outer face 27 of socket 28.

Figure 8:
FIGURE 8 is a sectional view taken along lines VIII—VIII of the ring shown in FIGURE 7.
Figure 12:
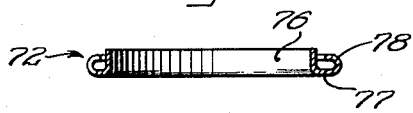
FIGURE 12 is a sectional view taken along lines XII—XII of the ring shown in FIGURE 11.
Figure 9:
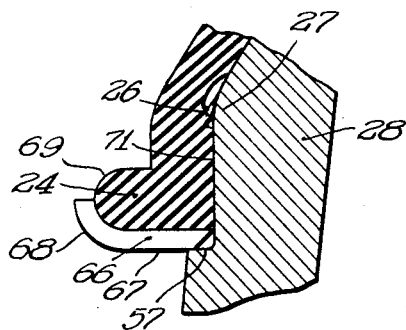
FIGURE 9 is a fragmentary cross-sectional view of the ring shown in FIGURE 7 and inner lip of the boot seal in sealing engagement with the socket.
Figure 13:
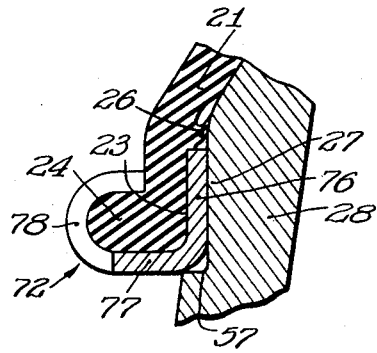
FIGURE 13 is a fragmentary cross-sectional view of the ring shown in FIGURE 11 and inner lip of the boot seal in sealing engagement with the socket.
Figure 10:
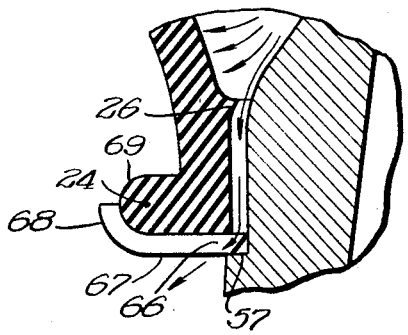
FIGURE 10 is a fragmentary cross-sectional view, illustrating the manner in which excess pressures are relieved from the interior of the boot seal fitted with the ring shown in FIGURE 7.

Other embodiments of the ring means are shown in FIGURES 7 and 8. The segmental ring 62 illustrated in FIGURE 7 has a pair of mating ends 63 and 64 defining a gap 66. A radial flange 67 underlies the large open end of the body 21 and bottom portion of the external bead 24. A rounded corner 68 partially surrounds the outer portion 69 of the external bead 24. Rings 62 can be bonded onto external bead 24 and when so secured will bottom on the shoulder 57 of the socket 28. Inner lip 26 will sealingly engage with outer face 27 of socket 28, however, in addition, portion 71 of the tubular body 21 adjacent the bottom of the lip 26 will also snugly fit the outer face 27 of socket 28 as shown in FIGURE 9. A buildup of high internal pressure in the body 21 causes the body 21 to expand and inner lip 26 and lower portion 71 to be displaced from the outer face 27 of the socket 28 permitting the excess lubricant to escape through vent passage 66, as shown in FIGURE 10.

Figure 11:
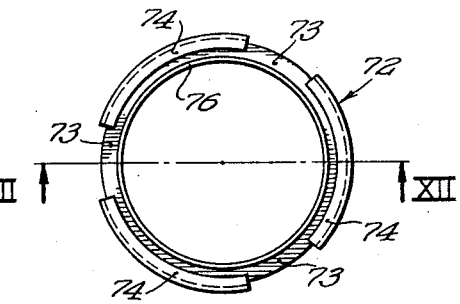
FIGURE 11 is a plan view of another embodiment of a ring for use with the boot seal of this invention.
Figure 14:
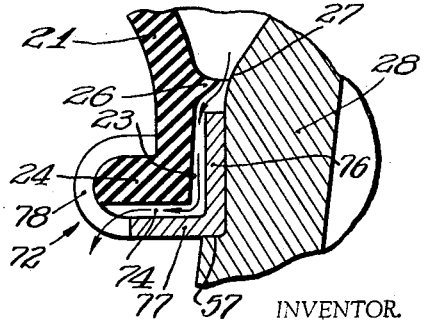
FIGURE 14 is a fragmentary cross-sectional view, illustrating the manner in which excess pressures are relieved from the interior of the boot seal fitted with the ring shown in FIGURE 11.

A third type of ring construction is illustrated in FIGURE 11 wherein ring 72 is shown. Transverse slots 73 are shown which are defined by U-shaped segmental portions 74 arranged on the upper portion of the outer periphery of the ring 72. A skirt 76 defines the inner circumference of the ring 72 and when the ring is crimped or bonded onto external bead 24 the entire inner wall 23 of tubular body 21 is displaced from the outer face 27 of the socket 28 as shown in FIGURE 14. A radial flange 77 extends outwardly along the bottom portion of the outer bead 24 with U-shaped portions 74 crimping the outer bead 24. Excessive buildups of internal pressure within the body 21 of the boot seal 20 causes the body 21 to expand thereby displacing inner lip 26 from its sealing engagement with outer face 27 of socket 28. Pressure relief is thereby accomplished by escape of excess lubricant through passageway 74 which traverses the ring 72 as shown in FIGURE 14. Pressure relief continues until the seal body 21 normalizes and allows lip 26 to sealingly engage outer face 27 of socket 28.

From the above it will be understood that this invention provides an efficient and inexpensive boot seal wherein an articulating joint assembly can be lubricated by unskilled persons without danger of damaging the boot seal.

I claim as my invention:

1. In combination with a joint assembly having a socket, a stud in said socket having a shank extending therefrom and a member secured to said stud having a radial wall facing said socket, a boot seal comprising a tubular resilient body around said shank between said socket and said wall, said body having an end face sealingly engaged with said wall and an opposite end around said socket, said body having an internal integral annular sealing lip adjacent said opposite end radially deformed by said socket to sealingly seat therearound, a collar secured to said opposite end beyond said lip and seated around said socket, said collar having vent means extending beyond said lip and being adjacent the side of the lip facing said opposite end of the body, and said lip being movable away from the socket to release excessive pressures from inside said body to said vent means.

2. The combination of claim 1 wherein the collar is a ring with an internal skirt lining the opposite end of the body terminating at said lip and seated on said socket.

3. The combination of claim 2 wherein the skirt has circumferentially spaced grooves providing the vents.

4. The combination of claim 2 wherein the skirt extends to an outturned flange disposed around and clamped to the opposite end of said body.

5. The combination of claim 1 wherein the collar is a split ring having a gap between the ends thereof providing the vent means.

6. The combination of claim 1 wherein the collar is a ring with a transverse slot providing the vent means.

References Cited

UNITED STATES PATENTS

| | | | |
|---|---|---|---|
| 2,739,724 | 3/1956 | Gora | 215—56 |
| 3,175,834 | 3/1965 | Wallace et al. | 277—212 |
| 3,248,955 | 5/1966 | Templeton | 287—90 |
| 3,262,706 | 7/1966 | Hassan | 287—90 |

FOREIGN PATENTS 612,646  1/1961  Canada.

CARL W. TOMLIN, *Primary Examiner.*

A. V. KUNDRAT, *Assistant Examiner.*